(12) United States Patent
Gulla et al.

(10) Patent No.: US 7,956,004 B2
(45) Date of Patent: Jun. 7, 2011

(54) CATALYST FOR ELECTROCHEMICAL REDUCTION OF OXYGEN

(75) Inventors: Andrea F. Gulla, Shaker Heights, OH (US); Robert J. Allen, South Harwich, MA (US)

(73) Assignee: Industrie de Nora S.p.A., Milan (IT)

( * ) Notice: Subject to any disclaimer, the term of this patent is extended or adjusted under 35 U.S.C. 154(b) by 554 days.

(21) Appl. No.: 12/070,832

(22) Filed: Feb. 21, 2008

(65) Prior Publication Data

US 2008/0202923 A1 Aug. 28, 2008

Related U.S. Application Data

(60) Provisional application No. 60/902,809, filed on Feb. 22, 2007.

(51) Int. Cl.
| | |
|---|---|
| B01J 21/18 | (2006.01) |
| B01J 23/00 | (2006.01) |
| B01J 23/40 | (2006.01) |
| B01J 23/74 | (2006.01) |
| B01J 27/02 | (2006.01) |
| B01J 27/055 | (2006.01) |
| B01J 27/049 | (2006.01) |
| B01J 27/045 | (2006.01) |
| H01M 4/02 | (2006.01) |
| H01M 4/36 | (2006.01) |
| H01M 4/90 | (2006.01) |
| H01M 4/62 | (2006.01) |

(52) U.S. Cl. ........ 502/185; 502/184; 502/216; 502/218; 502/220; 502/221; 502/223; 429/523; 429/526; 429/532; 429/534

(58) Field of Classification Search .......... 502/184, 502/185, 216, 218, 220, 221, 223; 429/523, 429/526, 532, 534
See application file for complete search history.

(56) References Cited

U.S. PATENT DOCUMENTS

| | | | | |
|---|---|---|---|---|
| 3,793,081 A | * | 2/1974 | Varga, Jr. | 429/498 |
| 4,956,331 A | * | 9/1990 | Tsurumi et al. | 502/339 |
| 6,149,782 A | * | 11/2000 | Allen et al. | 204/290.14 |
| 6,462,095 B1 | * | 10/2002 | Bonsel et al. | 516/97 |
| 6,855,660 B2 | * | 2/2005 | Tsou et al. | 502/216 |
| 6,967,185 B2 | * | 11/2005 | Allen et al. | 502/216 |
| 2005/0164877 A1 | * | 7/2005 | Allen et al. | 502/182 |
| 2007/0219086 A1 | * | 9/2007 | Gulla et al. | 502/201 |
| 2008/0121520 A1 | * | 5/2008 | Gulla et al. | 204/292 |

OTHER PUBLICATIONS

Reeve et al., "Methanol Tolerant Oxygen Reduction Catalysts Based on Transition Metal Sulfides", J. Electrochem. Soc., vol. 145, No. 10, Oct. 1998.*

* cited by examiner

*Primary Examiner* — Patricia L Hailey
(74) *Attorney, Agent, or Firm* — Charles A. Muserlian

(57) ABSTRACT

The invention relates to a sulphide catalyst for electrochemical reduction of oxygen particularly stable in chemically aggressive environments such as chlorinated hydrochloric acid. The catalyst of the invention comprises a noble metal sulphide single crystalline phase supported on a conductive carbon essentially free of zerovalent metal and of metal oxide phases, obtainable by reduction of metal precursor salts and thio-precursors with a borohydride or other strong reducing agent.

6 Claims, 1 Drawing Sheet

CATALYST FOR ELECTROCHEMICAL REDUCTION OF OXYGEN

This application is a non-provisional of U.S. provisional patent application Ser. No. 60/902,809 filed Feb. 22, 2007.

FIELD OF THE INVENTION

The invention relates to a catalyst, in particular to an electrocatalyst for oxygen reduction suitable for incorporation in a gas-diffusion electrode structure, and to a method for manufacturing the same.

BACKGROUND OF THE INVENTION

Noble metal sulphides are widely known in the field of electrocatalysis; in particular, electrocatalysts based on rhodium and ruthenium sulphide are currently incorporated in gas-diffusion electrode structures for use as oxygen-reducing cathodes in highly aggressive environments, such as in the depolarised electrolysis of hydrochloric acid.

Noble metal sulphide electrocatalysts of the prior art are for instance prepared by sparging hydrogen sulphide in an aqueous solution of a corresponding noble metal precursor, usually a chloride, for instance as disclosed in U.S. Pat. No. 6,149,782, entirely incorporated herein as reference, which is relative to a rhodium sulphide catalyst. The synthesis of noble metal sulphide catalysts with hydrogen sulphide in aqueous solutions is conveniently carried out in the presence of a conductive carrier, in most of the cases consisting of carbon particles. In this way, the noble metal sulphide is selectively precipitated on the carbon particle surface, and the resulting product is a carbon-supported catalyst, which is particularly suitable for being incorporated in gas-diffusion electrode structures characterised by high efficiency at reduced noble metal loadings. High surface carbon blacks, such as Vulcan XC-72 from Cabot Corp./USA are particularly fit to the scope.

A different procedure for the preparation of carbon-supported noble metal sulphide catalysts consists of an incipient wetness impregnation of the carbon carrier with a solution of a noble metal precursor salt, for instance a noble metal chloride, followed by solvent evaporation and gas-phase reaction under diluted hydrogen sulphide at ambient or higher temperature, whereby the sulphide is formed in a stable phase. This is for instance disclosed in US 2004/0242412, relating to a ruthenium sulphide catalyst.

A more advanced manufacturing process for noble metal sulphide catalysts is further disclosed in U.S. Pat. No. 6,967,185, entirely incorporated herein as reference, and consists of reacting a noble metal precursor with a thio-compound in an aqueous solution free of sulphide ions; in this way, a catalyst substantially equivalent to the one of U.S. Pat. No. 6,149,782 is obtained avoiding the use of a highly hazardous and noxious reactant such as hydrogen sulphide.

Although the catalysts disclosed in the above referenced documents proved of utmost importance for the successful commercialisation of hydrochloric acid electrolysers, they still presents some limitations in terms of activity and of stability to the particularly aggressive environment typical of such application and consisting of a hydrochloric acid solution containing significant amounts of dissolved chlorine and oxygen.

As regards the activity, noble metal sulphides precipitated by the methods of the prior art are all prepared by discrete reduction stages producing a mixture of different crystalline phases with different valences and stoichiometry, some of which present a poor electrochemical activity or none at all. Moreover, some of the most active formulation consist of ternary compounds which cannot be reliably prepared by the environmentally friend method of U.S. Pat. No. 6,967,185; the only viable process for obtaining ternary compounds, such as $Ru_xCo_zS_y$, which is also very attractive in terms of cost, is the one disclosed in US 2004/0242412, still relying on hydrogen sulphide as reactant species.

As concerns the stability, the above mentioned mixed-valence systems comprised of different crystalline phases typical of the catalysts of the prior art inevitably results to some extent in the formation of less stable phases such as zerovalent metals, metal oxides and non-stoichiometric perovskites. Although rhodium and ruthenium sulphides are much more stable than any other electrocatalyst for oxygen reduction of the prior art in the hydrochloric acid electrolysis environment, some leakage of noble metal is still detectable, especially when the cell is shut-down for maintenance.

OBJECTS OF THE INVENTION

It is one object of the present invention to provide a novel composition of sulphide catalyst for electrochemical reduction of oxygen overcoming the limitations of the prior art; in particular, it is an object of the present invention to provide a more active and stable catalyst for cathodic oxygen reduction in a process of hydrochloric acid electrolysis.

It is another object of the present invention to provide a gas-diffusion electrode incorporating a novel composition of sulphide catalyst useful as cathode in a process of depolarised hydrochloric acid electrolysis.

It is yet another object of the present invention to provide a novel method for manufacturing sulphide catalysts for electrochemical reduction of oxygen.

These and other objects will be clarified by the following description, which shall not be understood as a limitation of the invention, whose extent is exclusively defined by the appended claims.

DESCRIPTION OF THE INVENTION

Under a first aspect, the invention consists of a catalyst for electrochemical reduction of oxygen comprising a noble metal sulphide supported as a single well-defined crystalline phase on a conductive carbon; preferably, the noble metal catalyst of the invention is a single crystalline phase of a binary or ternary rhodium or ruthenium sulphide.

In the case of binary rhodium sulphides expressed by the general formula $Rh_xS_y$, the inventors have found that the manufacturing methods of the prior art invariably lead to a mixed-valence system at least comprising the species $Rh_2S_3$, $Rh_{17}S_{15}$, and $Rh_3S_4$ with some amount of metallic rhodium ($Rh^0$). Of all these species, $Rh_{17}S_{15}$ characterised by a crystal lattice corresponding to the (Pm-3m) space group is the most active, followed by monoclinic (C2/m) $Rh_2S_3$, while the remaining species present little or no activity and in some cases a lesser stability. $Rh^0$ is unstable in hydrochloric acid electrolysis conditions, and accounts for the quickest rhodium leaks during operation. In accordance with the processes of U.S. Pat. No. 6,149,782 and U.S. Pat. No. 6,967,185 for example, the typical amount of $Rh_{17}S_{15}$ is a little higher than 70% of the overall rhodium sulphide species.

The inventors have surprisingly found that a single crystalline phase of (Pm-3m) $Rh_{17}S_{15}$ on active carbon can be prepared by suitably modifying the environmentally-friendly manufacturing process disclosed in U.S. Pat. No. 6,967,185. The term single crystalline phase is used hereafter to mean a more than 90% pure crystal phase; in the cases of the (Pm-3m) $Rh_{17}S_{15}$ catalyst according to the invention, the single crystal phase obtained is about 95% pure with no detectable $Rh^0$. The method for manufacturing a single crystalline phase of (Pm-3m) $Rh_{17}S_{15}$ on active carbon comprises the steps of:
- reacting a precursor salt of rhodium, for instance $RhCl_3$, with a sulphur source such as a thiosulphate or thionate species in the presence of a strong reducing agent and of conductive carbon particles, thus precipitating an amorphous sulphide species on the carbon particles
- recovering the slurry, preferably by filtration
- heat treating the recovered slurry in inert atmosphere at a temperature of 500 to 1250° C. until obtaining a single crystalline phase corresponding to (Pm-3m) $Rh_{17}S_{15}$.

Besides thiosulphates and thionates, other sulphur sources can be used to initiate the metathesis step characterising the method of the invention: tetrathionates such as $Na_2S_4O_6.2H_2O$ and other similar thionate species such as dithionates, trithionates, pentathionates and heptathionates are all fit for this purpose, and also gaseous $SO_2$ possesses both the reducing power and the sulphur availability to produce amorphous $M_xS_y$ moieties on a selected support.

The support carbon particles have preferably a surface area comprised between 200 and 300 $m^2/g$, and the preferred specific loading of the resulting rhodium sulphide on carbon is comprised between 12 and 18%.

The sequence of addition of the reactants is critical to obtain the desired product: to the solution containing the suspended carbon particles and the rhodium precursor salt, the selected sulphur source (for instance a tiosulphate or thionate species) is added, so that the metathesis process can initiate. Simultaneously or immediately after, depending on the specific reaction, a strong reducing agent, defined as a species with a reduction potential below 0.14 V/SHE, is added in small aliquots. As reducing agent, sodium borohydride ($NaBH_4$) is preferred, but other suitable reactants include $LiAlH_4$, hydrazines, formaldehyde and metallic aluminium, zinc or antimony.

The reducing agent as defined has a reduction potential below the one of $S^0/S^{-2}$ couple: in this way, it can achieve the instantaneous metathesis of the metal ions and of the thiosulphate part, directly forming amorphous rhodium sulphide on the carbon support particles while preventing the formation of discrete reduction states, which are the main factor controlling the yield and phase distribution of the different sulphide moieties.

The method of the invention can be applied to the manufacturing of other single crystalline phases of noble metal sulphides, including not only sulphides of a single metal (binary sulphides) but also of two or more metals (ternary sulphides and so on). This proves particularly useful in the case of ruthenium sulphides, because also in this case the method of the invention gives rise to the most active and stable single crystalline phase.

By applying the method of the invention, binary ($RuS_2$) and ternary ($Ru_xM_zS_y$) ruthenium sulphides, M being a transition metal preferably selected among W, Co, Mo, Ir, Rh, Cu, Ag and Hg, precipitate in a single crystalline phase with lattice parameters corresponding to a pyrite-type lattice (Pa 3 space group). The resulting (Pa 3) $RuS_2$ or $Ru_xM_zS_y$ catalysts turn out to be more active and more stable in the hydrochloric acid electrolysis conditions than mixed-valence ruthenium sulphide systems of the prior art. The preferred catalyst specific loading and selected carbon support are the same applying for rhodium sulphide; also the method of manufacturing is substantially the same, even though suitable temperatures for the thermal treatment may vary from 150 to 1250° C.

The specific reaction pathway of the method according to the invention has the main advantage to intervene on the reduction potentials of the metals and the thionic moieties preventing the formation of discrete reduction states, which are the main factor controlling the yield and proper phase composition of the selected chalcogenide moiety as mentioned above. The method of the invention promotes the instantaneous metathesis of the metal ions and the thionic part. For instance, by reacting the chloride form of a transition metal such as rhodium, whose aqueous hydrolysis gives a pH in the range of 1 to 1.5, with sodium tetrathionate dihydrate ($Na_2S_4O_6.2H_2O$) and sodium borohydride ($NaBH_4$) in the presence of carbon, it is possible to directly synthesise amorphous $Rh_xS_y$ supported on carbon. The reaction is conducted at room temperature and can be followed by pH and spot tests. At completion, the slurry is collected and heat-treated in inert environment for a sufficient time to provide the required single phase rhodium sulphide supported catalyst. The same procedure can be used to obtain other binary and ternary sulphides with specific crystal phase distributions. In some cases, the kinetics and yield of the reaction can be improved by adding catalytic amounts of metals such as Al, Sn, Co and others.

The disclosed catalysts are suitable for being incorporated in gas-diffusion electrode structures on electrically conductive webs as known in the art.

The manufacturing of rhodium and of ruthenium sulphide catalysts according to the invention are disclosed in the following examples, which shall not be understood as limiting the invention; suitable variations and modifications may be trivially applied by one skilled in the art to manufacture other carbon supported-single crystalline phase sulphide catalysts of different noble and transition metals relying on the method of the invention without departing from the scope thereof.

EXAMPLE 1

Described herein is a method to precipitate a rhodium sulphide single crystalline phase on carbon according to the method of the invention; precipitation reactions of other noble metal sulphide catalysts (such as the sulphides of ruthenium, platinum, palladium or iridium) only require minor adjustments that can be easily derived by one skilled in the art.
- 7.62 g of $RhCl_3.H_2O$ were dissolved in 1 l of deionised water, and the solution was refluxed.
- 7 g of Vulcan XC 72-R high surface area carbon black from Cabot Corporation were added to the solution, and the mix was sonicated for 1 hour at 40° C.
- 8.64 g of $(NH_4)_2S_2O_3$ were diluted in 60 ml of deionised water, after which a pH of 7.64 was determined (sulphur source).
- 4.14 g of $NaBH_4$ were diluted into 60 ml of deionised water (reducing agent).

The rhodium/Vulcan solution was kept at room temperature and stirred vigorously while monitoring the pH. In this case, the sulphur source and reducing agent solutions were simultaneously added dropwise to the rhodium/Vulcan solution. During the addition, pH, temperature and colour of the solution were monitored. Constant control of the pH is essential in order to avoid the complete dissociation of the thionic compound to elemental $S^0$.

The kinetics of the reaction is very fast, therefore the overall precipitation of the amorphous sulphide occurs within few minutes from the beginning of the reaction. Cooling the reaction can help in slowing the kinetics if needed. The reaction was monitored by checking the colour changes: the initial deep pink/orange colour of the rhodium/Vulcan solution changes dramatically to grey/green (reduction of $Rh^{+3}$ to $Rh^{+2}$ species) and then colourless upon completion of the reaction, thus indicating a total absorption of the products on carbon. Spot tests were also carried out in this phase at various times with a lead acetate paper; limited amount of $H_2S$ was observed due to a minimal dissociation of the thionic species. The precipitate was allowed to settle and then filtered; the filtrate was washed with 1000 ml deionised water to remove any excess reagent, then a filter cake was collected and air dried at 110° C. overnight.

The dried product was finally subjected to heat treatment under flowing argon for 2 hours at 650° C., resulting in a weight loss of 22.15%.

The resulting carbon supported catalyst was first characterised in a corrosion test, to check its stability in a hydrochloric acid electrolysis environment.

For this purpose, part of the sample was heated to boiling in a chlorine-saturated HCl solution, at the same conditions disclosed in Example 4 of U.S. Pat. No. 6,149,782. The resulting solution was colourless, not even showing the characteristic trace pink of the more stable forms of rhodium sulphide of the prior art.

Figure 1:
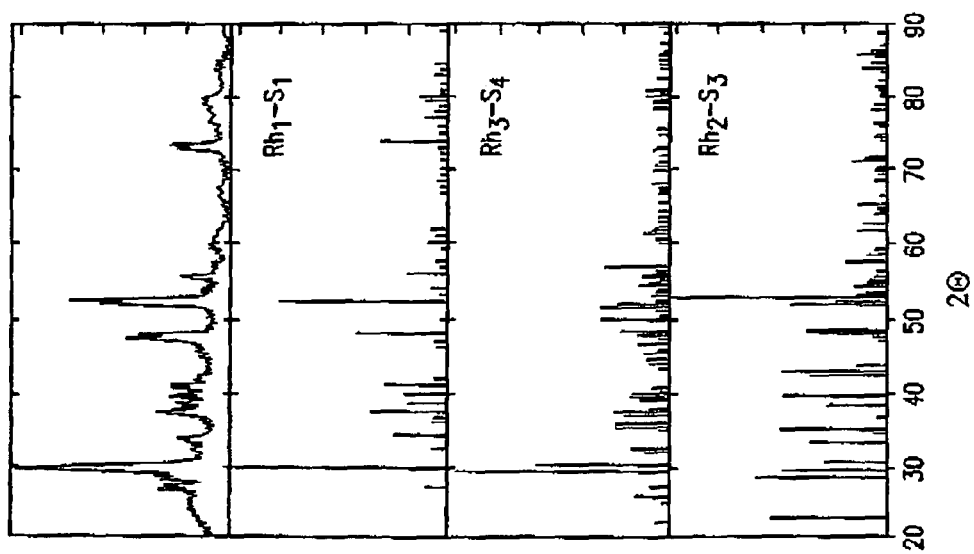
FIG. 1 shows an X-Ray diffractogram of a rhodium sulphide catalyst prepared according to the method of the invention.

An X-ray diffractogram of the rhodium sulphide catalyst is shown in FIG. 1. $Rh_xS_y$ usually obtained by precipitation is characterised by a balanced phase mixture of at least three Rh—S phases: orthorhombic (Pbcn) $Rh_2S_3$, monoclinic (C2/m) $Rh_3S_4$, and primitive cubic (Pm-3m) $Rh_{17}S_{15}$. The $Rh_2S_3$ phase is an electronic insulator built of alternating $RhS_6$ octahedra. The average Rh—Rh bond distance of 3.208 Å (compared to 2.69 Å in fcc Rh metal) thus removes any possibility of direct Rh—Rh bonding. In contrast, the $Rh_{17}S_{15}$ phase possesses semiconductor properties at room temperature. In addition, $Rh_{17}S_{15}$ consists of $Rh_8$ octahedra with an average Rh—Rh distance of 2.59 Å. The $Rh_3S_4$ phase, with its metallic $Rh_6$ octahedra eaves, is an active site for O(H) adsorption. The upper part of the FIGURE shows the diffractogram on top and the characteristic peaks of the different Rh—S phases below: the comparison clearly shows how the $Rh_{17}S_{15}$ phase is absolutely predominant (>95%) with a characteristic set of 4 peaks at 2θ=37.38–40.68° representing the (104), (114), (223), and (024) reflections, and the high intensity peaks at 47.64 and 52.16° indicating the (333) and (044) reflections.

Figure 2:
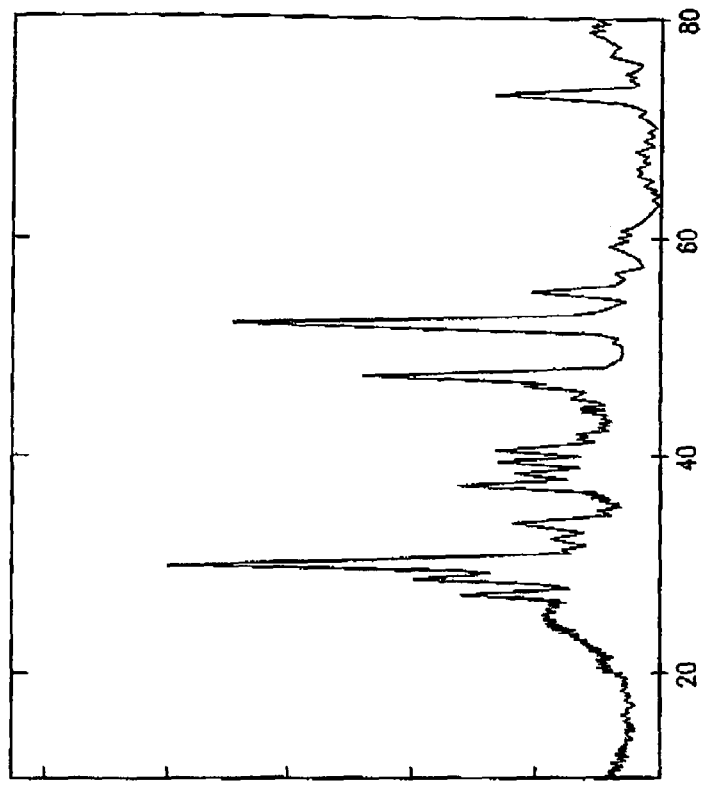
FIG. 2 shows the peaks of $Rh_{17}S_{15}$ phase.

This is even more evident in FIG. 2, where the characteristic peaks of the $Rh_{17}S_{15}$ phase are superposed to the XRD spectrum.

EXAMPLE 2

A ruthenium cobalt ternary sulphide (3:1) catalyst was prepared in a similar manner as the one of Example 1, the difference being that the thionic reagent is now part of the metal ion solution, thus the metathesis reaction occurs in-situ on the metal ion sites.

7.62 g of $RuCl_3.xH_2O$ were dissolved in 1 l of deionised water, and the solution was refluxed.

2.46 g of $CoCl_2.xH_2O$ were also added to the Ru containing solution and refluxed as above. 8 g of Vulcan XC72-R high surface area carbon black from Cabot Corporation were added to the solution, and the mix was sonicated for 1 hour at 40° C.

17.5 g of $(NH_4)_2S_2O_3$ were diluted in 100 ml of deionised water, after which a pH of 7.72 was determined, then added to the catalyst/Vulcan solution (sulphur source).

6.54 g of $NaBH_4$ were diluted into 100 ml of deionised water (reducing agent).

The sulphur source solution containing ruthenium, cobalt and Vulcan carbon black was kept at room temperature and stirred vigorously while monitoring the pH. Once the reducing agent solution was prepared, it was added dropwise to the sulphur source solution. During the addition of the reagents, pH, temperature and colour of the solution were monitored. Constant control of the pH is essential in order to avoid the complete dissociation of the thionic compound to elemental $S^0$.

As for Example 1, also in this case the kinetics of the reaction is very fast therefore the overall precipitation of the amorphous sulphide occurs within few minutes from the beginning of the reaction. Cooling the reaction can help in slowing the kinetics if needed. The reaction was monitored by checking the colour changes: the initial deep brown/orange colour of the initial solution changes dramatically to colourless upon completion of the reaction, thus indicating a total absorption of the products on the carbon. Spot tests were also carried out in this phase at various times with a lead acetate paper; limited amount of $H_2S$ was observed due to a minimal dissociation of the thionic species. Moreover, no $Co^0$ (metal) was observed; spot test for such particular metal is very straightforward because of the magnetic proprieties of $Co^0$. The precipitate was allowed to settle and then filtered; the filtrate was washed with 1000 ml deionised water to remove any excess reagent, then a filter cake was collected and air dried at 110° C. overnight.

The dried product was finally subjected to heat treatment under flowing nitrogen for 2 hours at 500° C., resulting in a weight loss of 32.5%.

The resulting carbon supported catalyst was subjected to the same corrosion and electrochemical tests of the previous example, showing identical results.

Actual performances in hydrochloric acid electrolysis of the catalyst prepared according to the method of the invention and incorporated in a gas-diffusion structure on a conductive web as known in the art were also checked.

EXAMPLE 3

Different samples of the catalysts of Examples 1 and 2 were prepared, mixed to a PTFE dispersion and incorporated into conventional flow-through gas diffusion electrode structures on carbon cloth. All the electrodes were compared to a standard state-of-the-art supported $Rh_xS_y$ electrode for hydrochloric acid electrolysis, according to the teaching of U.S. Pat. Nos. 6,149,782 and 6,967,185 (Sample 0). Such electrodes were tested as oxygen-consuming cathodes in a 50 $cm^2$ active area laboratory cell against a standard anode, making use of a by-product aqueous hydrochloric acid solution from an isocyanate plant. The overall cell voltage was recorded at two different current densities, namely 3 and 6 kA/m$^2$, and the corresponding values are reported in Table 1.

| Sample ID | voltage at 3 kA/m$^2$ | voltage at 6 kA/m$^2$ |
|---|---|---|
| 0 | 1.16 | 1.45 |
| Example 1 | 1.10 | 1.37 |
| Example 2 | 1.11 | 1.41 |

All of the tested electrode samples showed an excellent catalytic activity, resulting in a sensible voltage decrease with respect to the electrode activated with a rhodium sulphide catalyst of the prior art (sample 0).

Equivalent rhodium sulphide catalysts were obtained also by using sodium trithionate, tetrathionate and heptathionate precursors previously prepared according to known procedures, with minor adjustments easily derivable by one skilled in the art. Analogous corrosion and electrochemical results were obtained also in these cases.

The above description shall not be understood as limiting the invention, which may be practised according to different embodiments without departing from the scopes thereof, and whose extent is solely defined by the appended claims.

In the description and claims of the present application, the word "comprise" and its variations such as comprising and "comprises" are not intended to exclude the presence of other elements or additional components.

The invention claimed is:

1. A catalyst for electrochemical reduction of oxygen comprising a single crystalline phase noble metal sulfide of (Pm-3m) $Rh_{17}S_{15}$ supported on a conductive carbon.

2. The catalyst of claim 1 wherein said conductive carbon has a surface area of 200 to 300 m$^2$/g and the specific loading of said noble metal sulfide on said conductive carbon is 12 to 18%.

3. A gas diffusion electrode comprising the catalyst of claim 1 on a conductive web.

4. A method for manufacturing the catalyst of claim 1, comprising the steps of:
    reacting a precursor salt of rhodium with a sulfur source of a thiosulfate or thionate species in the presence of conductive carbon particles in an aqueous solution
    precipitating said rhodium sulfide on said conductive carbon particles by either simultaneously or subsequently adding a reducing agent having a reduction potential below 0.14 V/SHE to said aqueous solution
    recovering and heat treating the resulting slurry in an inert atmosphere until obtaining a single crystalline phase.

5. The method of claim 4 wherein said slurry is recovered by filtering and said heat treatment is carried out at 150 to 1250° C.

6. The method of claim 4 wherein said reducing agent is $NaBH_4$.

* * * * *